US009348158B2

(12) United States Patent
Hada et al.

(10) Patent No.: US 9,348,158 B2
(45) Date of Patent: May 24, 2016

(54) METHOD AND SYSTEM FOR PRODUCING LIQUID CRYSTAL PANEL

(75) Inventors: Kazuya Hada, Ibaraki (JP); Satoshi Hirata, Ibaraki (JP); Seiji Kondo, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 7 days.

(21) Appl. No.: 13/700,170

(22) PCT Filed: Jun. 22, 2011

(86) PCT No.: PCT/JP2011/064203
§ 371 (c)(1),
(2), (4) Date: Nov. 27, 2012

(87) PCT Pub. No.: WO2011/162271
PCT Pub. Date: Dec. 29, 2011

(65) Prior Publication Data
US 2013/0070194 A1 Mar. 21, 2013

(30) Foreign Application Priority Data

Jun. 24, 2010 (JP) .................. 2010-143905
Jun. 20, 2011 (JP) .................. 2011-135881

(51) Int. Cl.
*G02F 1/13* (2006.01)
*B29D 11/00* (2006.01)
(52) U.S. Cl.
CPC ........ *G02F 1/1303* (2013.01); *B29D 11/00288* (2013.01); *B29D 11/00644* (2013.01)
(58) Field of Classification Search
None
See application file for complete search history.

(56) References Cited

U.S. PATENT DOCUMENTS

| 4,029,382 A * | 6/1977 | Koda ............................ 439/272 |
| 2004/0233529 A1 | 11/2004 | Nagata et al. |
| 2008/0137187 A1 | 6/2008 | Nishida et al. |
| 2009/0199950 A1 | 8/2009 | Kitada et al. |

(Continued)

FOREIGN PATENT DOCUMENTS

| CN | 101214747 A | 7/2008 |
| CN | 101634769 A | 1/2010 |

(Continued)

OTHER PUBLICATIONS

International Search Report of PCT/JP2011/064203, mailing date of Sep. 13, 2011.

(Continued)

*Primary Examiner* — Richard Kim
(74) *Attorney, Agent, or Firm* — Westerman, Hattori, Daniels & Adrian, LLP (57) ABSTRACT

An object of the invention is to provide a method and a system for manufacturing a liquid crystal panel, which allow more successful bonding of an optical film to a liquid crystal cell. A pressing force Fa per unit area applied when the optical film is pressed by the first roller and a pressing force Fb per unit area applied when the liquid crystal cell is pressed by the second roller satisfy the relation Fa>Fb. On the first roller side, the feed may fail to be stabilized due to the influence of tension fluctuations or vibration acting on the first optical film, so that air bubbles may occur. When the second roller side, where such an influence does not occur, contributes more to the feed of the liquid crystal cell, the liquid crystal cell can be successfully fed in the process of bonding the optical film thereto.

8 Claims, 4 Drawing Sheets

(56) References Cited

U.S. PATENT DOCUMENTS

| | | | |
|---|---|---|---|
| 2010/0288441 A1 | 11/2010 | Kitada et al. | |
| 2010/0294418 A1 | 11/2010 | Yura et al. | |
| 2011/0005656 A1* | 1/2011 | Kitada et al. | 156/64 |

FOREIGN PATENT DOCUMENTS

| | | |
|---|---|---|
| JP | 2000-334836 A | 12/2000 |
| JP | 2003-022029 A | 1/2003 |
| JP | 2004-325539 A | 11/2004 |
| JP | 2005-305999 A | 11/2005 |
| JP | 2006-221158 A | 8/2006 |
| JP | 2009-061498 A | 3/2009 |
| JP | 2009-157363 A | 7/2009 |
| WO | 2009/096388 A1 | 8/2009 |

OTHER PUBLICATIONS

Translation of the International Preliminary Report on Patentability (PCT/IB/338) (1 page), (PCT/IB/373) (1 page) of International Application No. PCT/JP2011/064203 mailed Jan. 24, 2013 (Form PCT/ISA/237) (8 pages).

Taiwanese Office Action dated Jan. 8, 2014, issued in corresponding Taiwanese Application No. 100122328 with English Translation. (8 pages).

Korean Office Action dated Feb. 11, 2014, issued in corresponding Korean Patent application No. 10-2013-7001765, w/ English translation (12 pages).

Chinese Office Action dated Aug. 14, 2014, issued in corresponding CN application No. 201180022689.2 with English translation (19 pages).

Korean Office Action dated Aug. 22, 2014, issued in corresponding KR application No. 10-2013-7001765 with English translation (6 pages).

Office Action dated Feb. 17, 2015, issued in corresponding Chinese Application No. 201180022689.2, w/English translation. (17 pages).

Extended European Search Report dated Feb. 18, 2016, issued in counterpart European Patent Application No. 11798153.0 (5 pages).

\* cited by examiner

METHOD AND SYSTEM FOR PRODUCING LIQUID CRYSTAL PANEL

TECHNICAL FIELD

The invention relates to a method and a system for manufacturing a liquid crystal panel by a process including: catching an optical film and a liquid crystal cell between a first roller and a second roller opposed to each other, while peeling off a release film from a laminate including the release film and the optical film placed thereon; and applying a pressing force from the first roller to the optical film and applying a pressing force from the second roller to the liquid crystal cell, so that the optical film is bonded to the liquid crystal cell.

BACKGROUND ART

It is known that when a film is bonded to a substrate such as a liquid crystal cell, the substrate and the film are caught between a pair of rollers opposed to each other (see for example Patent Document 1). A conventional pair of rollers used in the process of bonding an optical film, which typically includes a polarizing plate or the like, to a liquid crystal cell are usually the same in diameter and hardness. The pair of rollers disclosed in Patent Document 1 also have the same geometry.

In some cases, when an optical film is bonded to a liquid crystal cell, a long release film is used as a carrier film, on which the optical film being fed is held. A pressure-sensitive adhesive layer is formed on the optical film, and the release film is attached to the optical film with the pressure-sensitive adhesive layer interposed therebetween. While the release film is peeled off from the optical film being fed, the optical film is bonded to the liquid crystal cell with the pressure-sensitive adhesive layer interposed between, so that a liquid crystal panel is formed.

PRIOR ART DOCUMENT

Patent Document

Patent Document 1: JP-A-2000-334836

SUMMARY OF THE INVENTION

Problems to be Solved by the Invention

In the conventional system with the same rollers, however, the pressing force per unit area acting on the optical film is equal to the pressing force per unit area acting on the liquid crystal cell. In this case, fluctuations in the pressing force acting on the liquid crystal cell during the bonding or very small vibrations of the optical film can easily cause air bubbles between the liquid crystal cell and the optical film in the liquid crystal panel product. Thus, there is a problem in which due to the air bubbles, a display defect may occur in the liquid crystal panel.

The invention has been made in view of the above circumstances, and an object of the invention is to provide a method and a system for manufacturing a liquid crystal panel, which allow more successful bonding of an optical film to a liquid crystal cell.

As a result of an earnest study, the inventors have found that concerning the contact between an optical film and a roller (first roller) pressing the optical film toward the liquid crystal cell, pressure unevenness-induced air bubbles becomes more likely to occur as the pressure on the optical film decreases.

As a result of the study, the inventors have planned to use a smaller-diameter roller as the first roller so that the pressure on the optical film can be increased by reducing the contact area between the first roller and the optical film. Unfortunately, when the same roller (second roller) as the first roller is used to press the liquid crystal cell toward the optical film as in the conventional system, it has been difficult to prevent air bubbles from occurring in the liquid crystal panel product. Specifically, it has been found that when the width of the contact between the optical film and the first roller is equal to the width of the contact between the liquid crystal cell and the second roller, slight torsion inevitably occurs between the first and second rollers (due to the accuracy of the system, the uniformity of the material, etc.), so that a region where the pressing by the first roller is not supported by the second roller is formed to cause uneven pressure-induced air bubbles.

In addition, the pressing forces of the first and second rollers cannot be controlled point-by-point for continuous manufacture in a liquid crystal panel-manufacturing method including: catching an optical film and a liquid crystal cell between the first and second rollers opposed to each other, while peeling off a release film from a laminate including the release film and the optical film placed thereon; and applying a pressing force from the first roller to the optical film and applying a pressing force from the second roller to the liquid crystal cell, so that the optical film is continuously bonded to the liquid crystal cell.

Means for Solving the Problems

The invention, which has been accomplished based on the study described above, is characterized in that the pressing force per unit area applied by the first roller differs from that applied by the second roller. Hereinafter, a description is given of the invention.

The invention is directed to a method for manufacturing a liquid crystal panel, which includes: catching an optical film and a liquid crystal cell between a first roller and a second roller opposed to each other, while peeling off a release film from a laminate including the release film and the optical film placed thereon; and applying a pressing force from the first roller to the optical film and applying a pressing force from the second roller to the liquid crystal cell, so that the optical film is bonded to the liquid crystal cell, wherein a pressing force Fa per unit area applied when the optical film is pressed by the first roller and a pressing force Fb per unit area applied when the liquid crystal cell is pressed by the second roller satisfy the relation Fa>Fb.

According to the invention, in the continuous feeding system by roller bonding, the pressing force on the low-stiffness film side is set high, while the pressing force on the high-stiffness cell side is set low, so that a sufficient length of contact with the cell and a sufficient pressure on the film are achieved at the same time. This is effective in improving the reliability of continuous production of liquid crystal panels without the aid of extensive control of the film tension or sophisticated control of the rollers. This is supported by the examples and the comparative examples shown below.

For example, the widthwise direction may be defined as a direction perpendicular to the direction of the feed of the optical film and the liquid crystal cell (a direction parallel to the first and second rollers). In this case, when the width of the contact between the first optical film and the first roller is equal to the width of the contact between the liquid crystal cell and the second roller, the second roller, which applies a lower pressing force per unit area, provides a longer contact length along the feed direction for the liquid crystal cell.

Since the liquid crystal cell is fed by the frictional forces of the first and second rollers, the second roller with the longer contact length can contribute more to the feed of the liquid crystal cell than the first roller. On the first roller side, the feed may fail to be stabilized due to the influence of tension fluctuations or vibration acting on the first optical film, so that air bubbles may occur. When the second roller side, where such an influence does not occur, contributes more to the feed of the liquid crystal cell, the liquid crystal cell can be successfully fed in the process of bonding the optical film thereto. Thus, the optical film can be more successfully bonded to the liquid crystal cell.

The feature that the contact length between the second roller and the liquid crystal cell is relatively long is also advantageous in that the tolerance to relative torsion between the first and second rollers is relatively high, so that the required placement accuracy can be low.

The Fa is preferably 0.08 MPa or more, and the Fb is preferably 0.49 MPa or less.

In an embodiment of the invention, when the pressing force Fa per unit area applied when the first optical film is pressed by the first roller is 0.08 MPa or more, stable bonding can be performed while variations in the pressure of the first roller against the optical film is reduced, so that air bubbles are less likely to occur. When the pressing force Fb per unit area applied when the liquid crystal cell is pressed by the second roller is 0.49 MPa or less, gap unevenness, abnormal brightness, cracking, or destruction of the liquid crystal cell can be prevented. In other words, if the same roller (second roller) as the first roller is used to press the liquid crystal cell toward the optical film as in the conventional system, a relatively high pressure can act on the liquid crystal cell due to the relatively small contact area between the second roller and the liquid crystal cell, so that gap unevenness or the like may be more likely occur, but this is effectively suppressed by the invention.

The first roller preferably has a diameter of 15 to 80 mm.

If the diameter of the first roller is less than 15 mm, the first roller may have low stiffness, so that the first roller may become unstable during the bonding and may vibrate at a higher rotational speed. If the diameter of the first roller is more than 80 mm, it may become difficult to reduce the distance that the optical film travels after it is peeled off from the release film and fed from the release film-peeling position and until it reaches the optical film-bonding position, so that the optical film may become less likely to be stable in the bonding position due to tension fluctuations or vibration acting on the optical film. According to the invention, therefore, the diameter of the first roller can be set to an appropriate value, so that the optical film can be more successfully bonded to the liquid crystal cell.

A backup roller is preferably provided in contact with the opposite side of the first roller from the liquid crystal cell.

If the first roller has a smaller diameter, it may have lower stiffness, so that the pressing force may be more likely to vary. However, use of the backup roller can complement the stiffness of the first roller and reduce pressure variations. Therefore, even with the first roller having a smaller diameter, the optical film can be more successfully bonded to the liquid crystal cell.

The invention is also directed to a system for manufacturing a liquid crystal panel, which includes a first roller and a second roller opposed to each other for bonding an optical film to a liquid crystal cell by a process including catching the optical film and the liquid crystal cell between the first and second rollers, while peeling off a release film from a laminate including the release film and the optical film placed thereon, and applying a pressing force from the first roller to the optical film and applying a pressing force from the second roller to the liquid crystal cell, wherein a pressing force Fa per unit area applied when the optical film is pressed by the first roller and a pressing force Fb per unit area applied when the liquid crystal cell is pressed by the second roller satisfy the relation Fa>Fb.

The Fa is preferably 0.08 MPa or more, and the Fb is preferably 0.49 MPa or less.

The first roller preferably has a diameter of 15 to 80 mm.

A backup roller is preferably provided in contact with the opposite side of the first roller from the liquid crystal cell.

MODE FOR CARRYING OUT THE INVENTION

Figure 1:
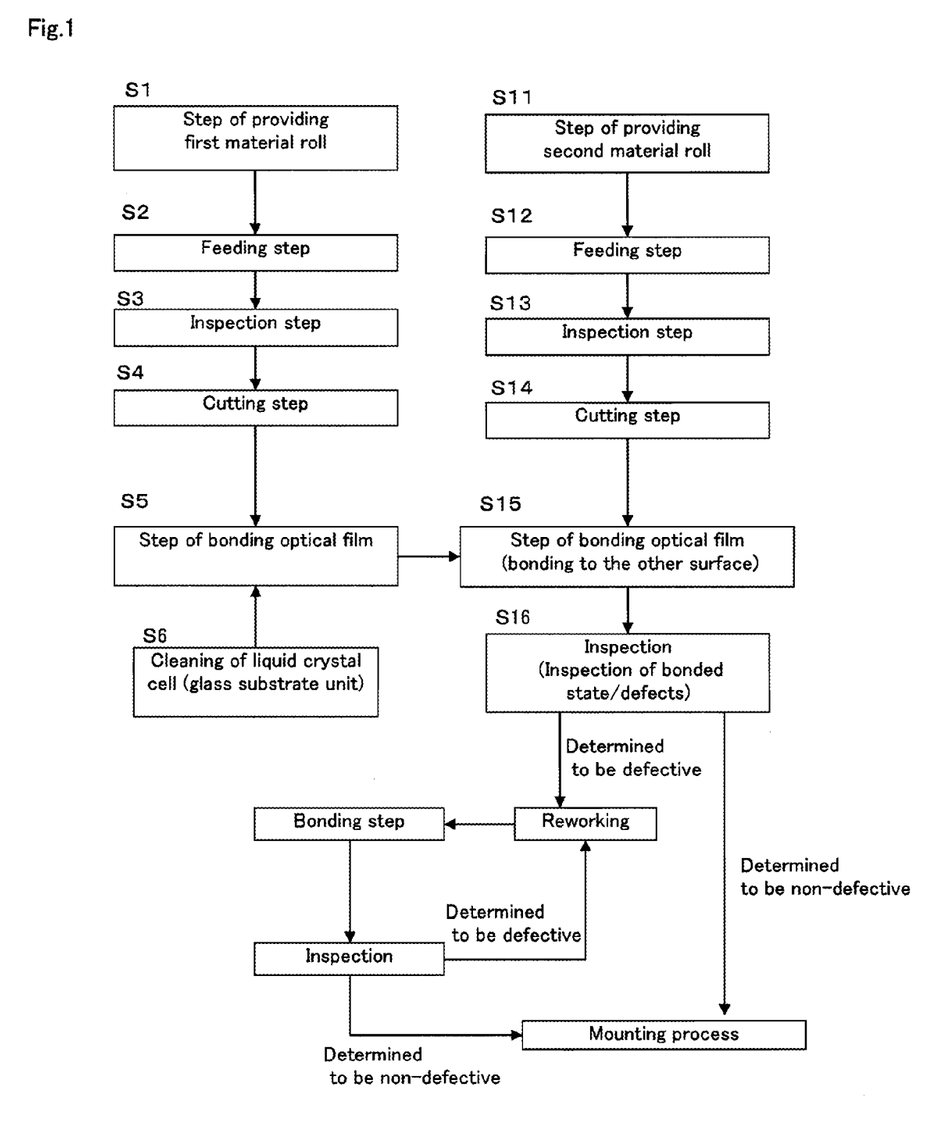
FIG. 1 is a flow chart showing an example of the liquid crystal panel manufacturing method according to an embodiment of the invention.
Figure 2:
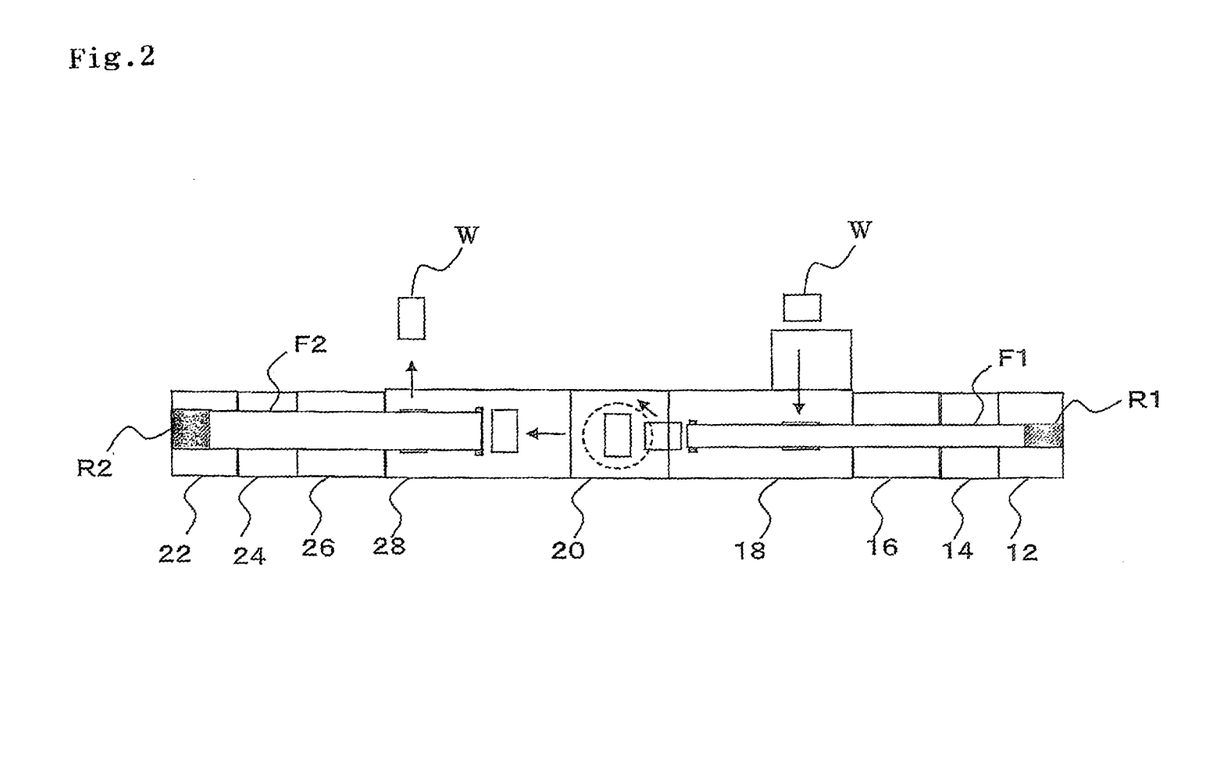
FIG. 2 is a schematic plan view showing an example of the liquid crystal panel manufacturing system.

An embodiment of the invention is described below. FIG. 1 is a flow chart showing an example of the liquid crystal panel manufacturing method according to an embodiment of the invention. FIG. 2 is a schematic plan view showing an example of the liquid crystal panel manufacturing system.

(Liquid Crystal Cell)

The liquid crystal cell W used in the liquid crystal panel manufactured according to the invention is typically a glass substrate unit including a pair of glass substrates and a liquid crystal material disposed between the substrates. The liquid crystal cell W typically has, for example, a rectangular shape.

(Optical Film)

The optical film, which is bonded to the liquid crystal cell W when a liquid crystal panel is manufactured according to the invention, is typically a polarizing film, a retardation film, a brightness enhancement film, a laminated film including a combination of two or more of these films, or the like. A pressure-sensitive adhesive layer to be bonded to the liquid crystal cell W is formed on one surface of the optical film, and a release film is provided thereon to protect the pressure-sensitive adhesive layer. A surface protecting film is provided on the other surface of the optical film with a pressure-sensitive adhesive layer interposed therebetween. Hereinafter, a laminate including the optical film and the surface protecting film and the release film placed on the optical film is also referred to as a sheet material.

Figure 3:
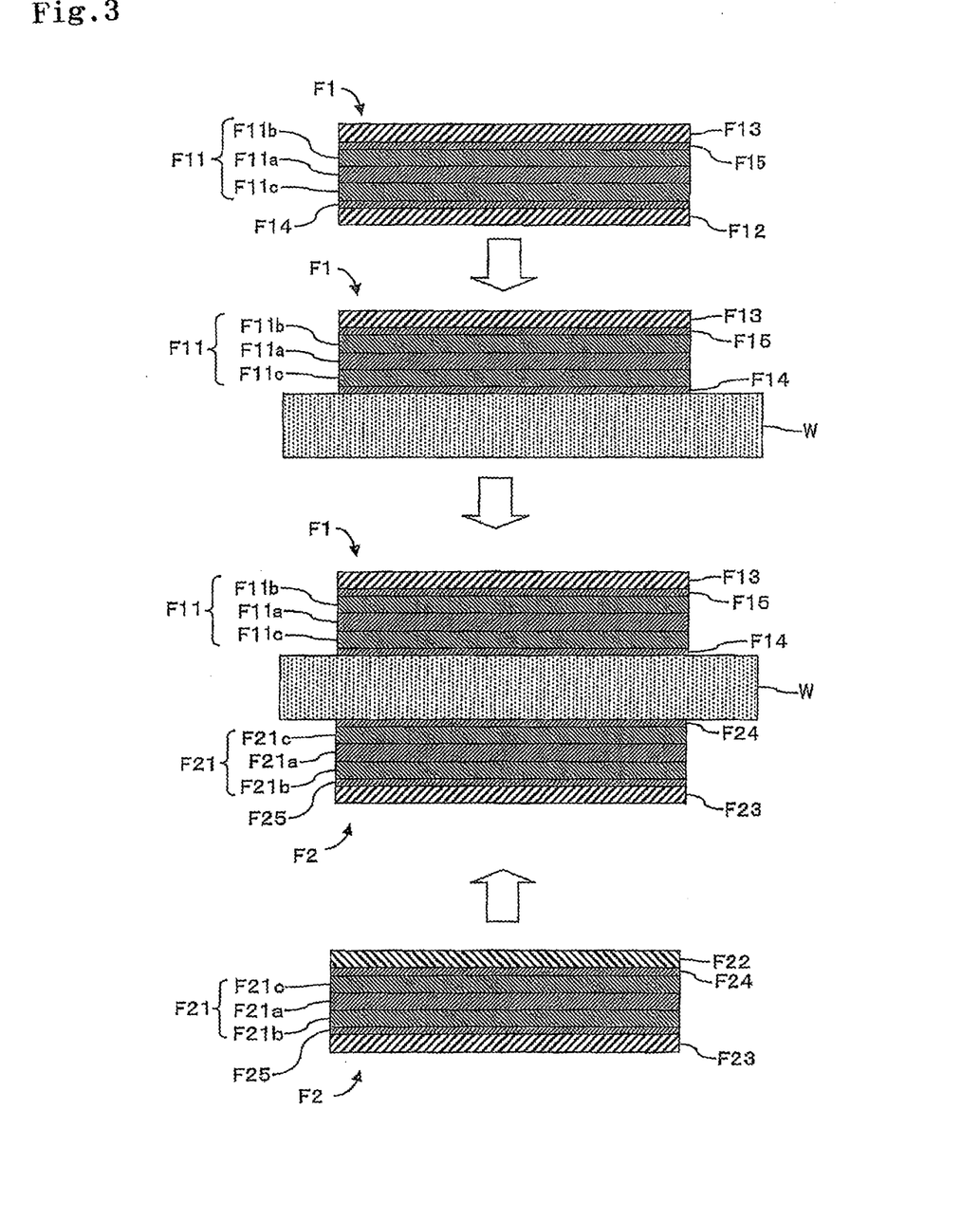
FIG. 3 is a cross-sectional view showing an example of the process of bonding an optical film to a liquid crystal cell.

FIG. 3 is a cross-sectional view showing an example of the process of bonding the optical film to the liquid crystal cell W. In an embodiment of the invention, a first sheet material F1 including a first optical film F11 is used to be bonded to one surface of a liquid crystal cell W, and a second sheet material F2 including a second optical film F21 is used to be bonded to the other surface of the liquid crystal cell W. It will be understood that the feature that optical films are bonded to both surfaces of the liquid crystal cell W is not intended to limit the invention and that the feature that an optical film is bonded to only one surface of the liquid crystal cell W is also applicable to the invention.

The first sheet material F1 has a structure in which a first optical film F11, a first release film F12, and a surface protecting film F13 are stacked. The first optical film F11 includes a first polarizer F11a, a first film F11b bonded to one surface thereof with an adhesive layer (not shown) interposed therebetween, and a second film F11c bonded to the other surface thereof with an adhesive layer (not shown) interposed therebetween.

For example, the first and second films F11b and F11c are polarizer protecting films (such as triacetylcellulose films or PET films). The second film F11c is bonded to the liquid crystal cell W with a first pressure-sensitive adhesive layer F14 interposed therebetween. The first film F11b may be subjected to a surface treatment. For example, the surface treatment may be a hard coating treatment, an antireflection treatment, or a treatment for any other purpose such as an anti-sticking, diffusion, or antiglare purpose. The first release film F12 is bonded to the second film F11c with the first pressure-sensitive adhesive layer F14 interposed therebetween. The surface protecting film F13 is bonded to the first film F11b with a pressure-sensitive adhesive layer F15 interposed therebetween.

The second sheet material F2 has the same laminated structure as the first sheet material F1, but such a feature is non-limiting. The second sheet material F2 has a structure in which a second optical film F21, a second release film F22, and a surface protecting film F23 are stacked. The second optical film F21 includes a second polarizer F21a, a third film F21b bonded to one surface thereof with an adhesive layer (not shown) interposed therebetween, and a fourth film F21c bonded to the other surface thereof with an adhesive layer (not shown) interposed therebetween.

For example, the third and fourth films F21b and F21c are polarizer protecting films (such as triacetylcellulose films or PET films). The fourth film F21c is bonded to the liquid crystal cell W with a second pressure-sensitive adhesive layer F24 interposed therebetween. The third film F21b may be subjected to a surface treatment. For example, the surface treatment may be a hard coating treatment, an antireflection treatment, or a treatment for any other purpose such as an anti-sticking, diffusion, or antiglare purpose. The second release film F22 is bonded to the fourth film F21c with the second pressure-sensitive adhesive layer F24 interposed therebetween. The surface protecting film F23 is bonded to the third film F21b with a pressure-sensitive adhesive layer F25 interposed therebetween.

(Manufacturing Flow Chart)

(1) Step of Providing First Material Roll (51 in FIG. 1). A first material roll R1 is provided, which is formed by winding the long first sheet material F1 into a roll. The first material roll R1 has a width depending on the size of the liquid crystal cell W to be bonded. Specifically, the first material roll R1 is formed by winding, into a roll, the first sheet material F1 including the first optical film F11 with a width corresponding to the short or long side of the liquid crystal cell W.

(2) Feeding Step (S2 in FIG. 1). A first feeder 12 draws and feeds the first sheet material F1 to the downstream side from the first material roll R1 provided and placed.

(3) First Inspection Step (S3 in FIG. 1). The first sheet material F1 is inspected for defects using a first defect inspection apparatus 14. In this step, the defect inspection method may be a method of performing imaging and image processing on both sides of the first sheet material F1 with transmitted light or reflected light, a method of performing imaging and image processing with a polarizing film for inspection arranged in a crossed Nicols relationship (also referred to as "0° cross") with the absorption axis of the polarizing plate, which is the object to be inspected, between a CCD camera and the object, or a method of performing imaging and image processing with a polarizing film for inspection arranged at a certain angle (for example, in the range of more than 0° to 10°, also referred to as "X° cross") with the absorption axis of the polarizing plate, which is the object to be inspected, between a CCD camera and the object. For example, gray-scale determination based on binarization may be used in the image processing algorithm to detect defects.

Defect information detected by the first defect inspection apparatus 14 is associated with the positional information (such as position coordinates) and sent to a controller so that it can contribute to the cutting process with a first cutting apparatus 16.

(4) First Cutting Step (S4 in FIG. 1). While leaving the first release film F12 uncut, the first cutting apparatus 16 cuts, into a predetermined size, the first optical film F11, to which the first release film F12 is bonded, and the surface protecting film F13, which is bonded to the first optical film F11. For example, the cutting means may be a laser, a cutter, or the like. The cutting is preferably performed based on the defect information detected by the first defect inspection apparatus 14 so that defects can be avoided. This significantly increases the first sheet material F1 yield. Defective parts of the first sheet material F1 are removed by a first rejection apparatus (not shown) so as not to be bonded to the liquid crystal cell W. In this embodiment, the first optical film F11 is cut into a length corresponding to the long side of the liquid crystal cell W. Alternatively, however, it may be cut into a length corresponding to the short side of the liquid crystal cell W when the first material roll R1 has a width corresponding to the long side of the liquid crystal cell W.

All of the step of providing the first material roll, the first inspection step, and the first cutting step are preferably performed in a continuous manufacturing line. In the above series of manufacturing steps, a cut piece of the first optical film F11 is formed, which is to be bonded to one surface of the liquid crystal cell W. A description is given below of a process of forming a cut piece of the second optical film F21, which is to be bonded to the other surface of the liquid crystal cell W.

(5) Step of Providing Second Material Roll (S11 in FIG. 1). A second material roll R2 is provided, which is formed by winding the long second sheet material F2 into a roll. The second material roll R2 has a width depending on the size of the liquid crystal cell W to be bonded, and is typically formed with a width different from that of the first material roll R1. Specifically, when the first material roll R1 is formed with a width corresponding to the long side of the liquid crystal cell W, the second material roll R2 is formed with a width corresponding to the short side of the liquid crystal cell W, and when the first material roll R1 is formed with a width corresponding to the short side of the liquid crystal cell W, the second material roll R2 is formed with a width corresponding to the long side of the liquid crystal cell W.

(6) Feeding Step (S12 in FIG. 1). A second feeder 22 draws and feeds the second sheet material F2 to the downstream side from the second material roll R2 provided and placed.

(7) Second Inspection Step (S13 in FIG. 1). The second sheet material F2 is inspected for defects using a second defect inspection apparatus 24. In this step, the defect inspection method is the same as the above method using the first defect inspection apparatus 14. Alternatively, the first inspection step (S3) and the second inspection step (S13) may be omitted. In such a case, the first and second sheet materials F1 and F2 may be inspected for defects at a stage where the first and second material rolls R1 and R2 are manufactured, and liquid crystal panels W may be manufactured using the first and second material rolls R1 and R2 to which the defect information obtained by the defect inspection has been attached.

(8) Second Cutting Step (S14 in FIG. 1). While leaving the second release film F22 uncut, the first cutting apparatus 26 cuts, into a predetermined size, the second optical film F21, to which the second release film F22 is bonded, and the surface protecting film F23, which is bonded to the second optical film F21. For example, the cutting means may be a laser, a cutter, or the like. The cutting is preferably performed based on the defect information detected by the second defect inspection apparatus 24 so that defects can be avoided. This significantly increases the second sheet material F2 yield. Defective parts of the second sheet material F2 are removed by a second rejection apparatus (not shown) so as not to be bonded to the liquid crystal cell W. In this embodiment, the second optical film. F21 is cut into a length corresponding to the short side of the liquid crystal cell W. Alternatively, however, it may be cut into a length corresponding to the long side of the liquid crystal cell W when the second material roll R2 has a width corresponding to the short side of the liquid crystal cell W.

The step of feeding the liquid crystal cell W is performed in parallel with the step of forming cut pieces of the first and second optical films F11 and F21, respectively. The liquid crystal cell W is subjected to the process described below while it is fed.

(9) Cleaning Step (S6 in FIG. 1). The surface of the liquid crystal cell W is cleaned by polishing cleaning, water cleaning, or any other cleaning method.

(10) Step of Bonding First Optical Film (S5 in FIG. 1). The cut piece of the first optical film F11 is bonded to one surface of the liquid crystal cell W with the pressure-sensitive adhesive layer F14 interposed therebetween by a first bonding apparatus 18, while the first release film F12 is peeled off. In the bonding, the first optical film F11 and the liquid crystal cell W are inserted and press-bonded between a pair of rollers opposed to each other.

(11) Step of Bonding Second Optical Film (S15 in FIG. 1). The cut piece of the second optical film F21 is bonded to the other surface of the liquid crystal cell W with the pressure-sensitive adhesive layer F24 interposed therebetween by a second bonding apparatus 28, while the second release film F22 is peeled off. In the bonding, the second optical film F21 and the liquid crystal cell W are inserted and press-bonded between a pair of rollers opposed to each other. Before the second optical film F21 is bonded to the liquid crystal cell W, the liquid crystal cell W with the first optical film F11 bonded thereto is rotated by 90° using a turning mechanism 20 so that the first optical film F11 can have a crossed-Nicols relationship with the second optical film F21. However, the rotation of the liquid crystal cell W by 90° is non-limiting, and alternatively, the system may be configured so that the first sheet material F1 and the second sheet material F2 can be fed in directions perpendicular to each other, which also makes possible the crossed-Nicols relationship between the first and second optical films F11 and F21.

(12) Step of Inspecting Liquid Crystal Cell (S16 in FIG. 1). The liquid crystal cell W with both surfaces bonded to the optical films F11 and F12 is inspected using an inspection apparatus. An example of the inspection method is a method of performing imaging and image processing on both sides of the liquid crystal cell W with transmitted light and reflected light. Another example of the method uses a polarizing film for inspection placed between a CCD camera and the object to be inspected. For example, gray-scale determination based on binarization may be used in the image processing algorithm to detect defects.

(13) Defect information detected by the inspection apparatus is used to determine whether the liquid crystal cell W is non-defective. The liquid crystal cell W determined to be non-defective is transferred to the next mounting process. When determined to be defective, it is subjected to a reworking process, in which a new piece of the optical film F11 or F21 is bonded, and then the product is inspected. The product determined to be non-defective is transferred to the mounting process, but the product determined to be defective is subjected to the reworking process again or to disposal.

In the above series of manufacturing steps, the first optical film F11 bonding step and the second optical film F21 bonding step may be performed in a continuous manufacturing line, which makes it possible to manufacture the liquid crystal panel W in an advantageous manner.

A description has been given of a method that includes leaving the release films F12 and F22 uncut and cutting other components of the sheet materials F1 and F2 (half-cutting method). Alternatively, however, any other method than the above may be used as long as it can feed the optical films F11 and F21 being held on the release films F12 and F22, respectively, which serve as carrier films. For example, material rolls having undergone half-cutting may be used, in which other components of the sheet materials F1 and F2 than the release films F12 and F22 are already cut. In addition, the optical films F11 and F21 do not have to be cut before they are bonded and may be cut while being bonded or after bonded.

Figure 4:
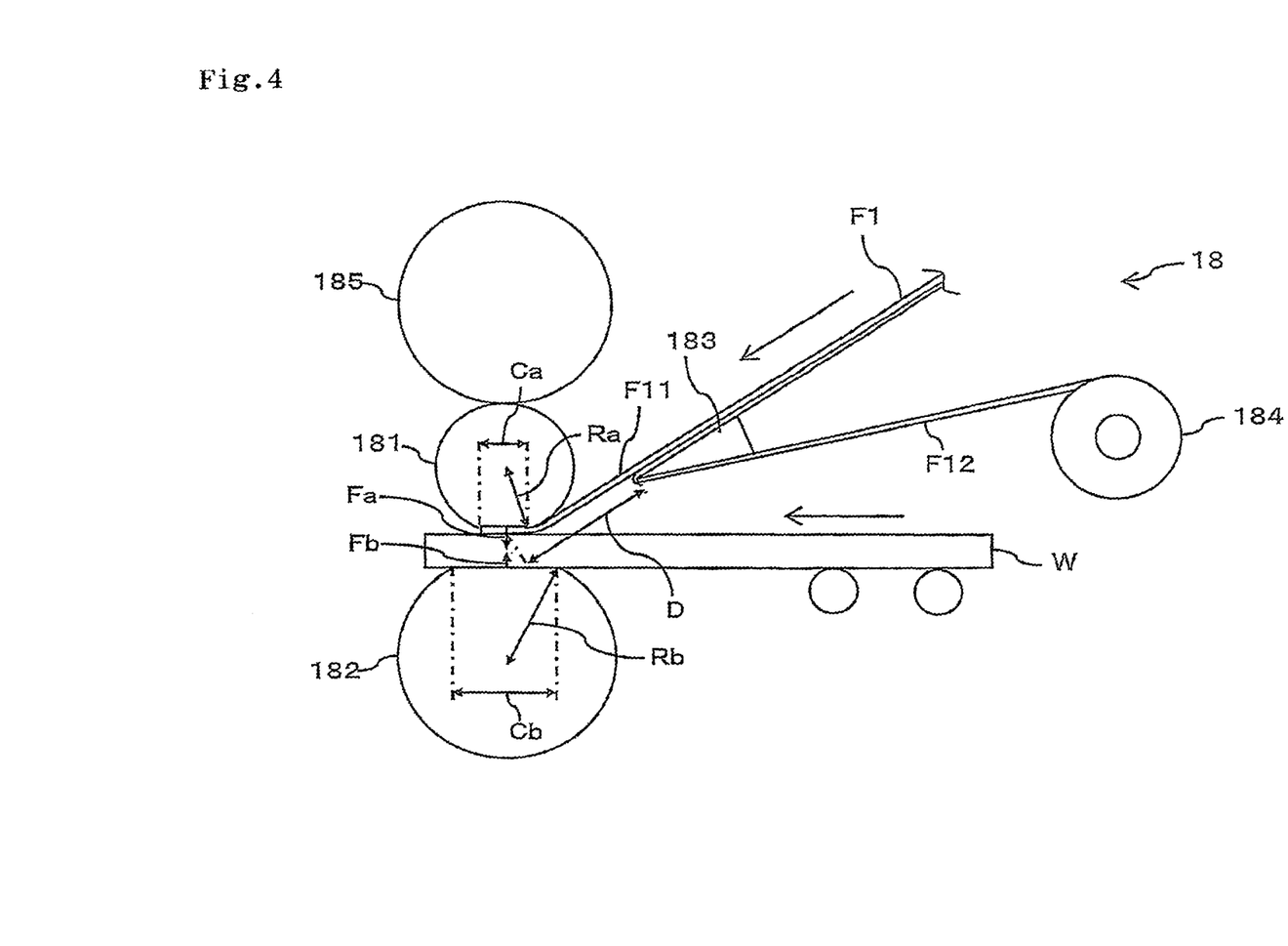
FIG. 4 is a schematic cross-sectional view showing an example of the configuration of a first bonding apparatus.

FIG. 4 is a schematic cross-sectional view showing an example of the configuration of the first bonding apparatus 18. In this example, the first optical film F11 is bonded to the liquid crystal cell W from the upper side. In this case, the second bonding apparatus 28 is configured to bond the second optical film F21 to the liquid crystal cell W from the lower side. Therefore, the second bonding apparatus 28 may have a configuration that is only upside down relative to that of the first bonding apparatus 18, and therefore, a detailed description of the second bonding apparatus 28 is omitted. Alternatively, however, the first optical film F11 may be bonded to the liquid crystal cell W from the lower side, and the second optical film F21 may be bonded to the liquid crystal cell W from the upper side. When a mechanism is provided for turning over the liquid crystal cell W after the bonding of the first optical film F11, the system may be configured so that both the first and second optical films F11 and F21 can be bonded to the liquid crystal cell W from the same direction. The mechanism provided for turning over the liquid crystal cell W may be a turning-over mechanism separate from the turning mechanism 20 for rotating the liquid crystal cell W by 90° or may be a mechanism for rotating the liquid crystal cell W by 90° while turning over the liquid crystal cell W.

The first optical film F11 fed to the first bonding apparatus 18 is bonded to the liquid crystal cell W, while the first release film F12 is peeled off. The first release film F12 may be peeled off using a peeling mechanism 183 having a sharp-ended knife edge part. The first release film F12 is fed and turned backward along the knife edge part of the peeling mechanism 183 so that it can be peeled off from the first optical film F11 and wound on a take-up roller 184.

The first bonding apparatus 18 has a first roller 181 and a second roller 182 opposed to each other. The first optical film F11, from which the first release film F12 is peeled off, and the liquid crystal cell W are caught between the pair of rollers 181 and 182 so that the first optical film F11 is bonded to the liquid crystal cell W with the pressure-sensitive adhesive layer F14 interposed therebetween. The first and second rollers 181 and 182 are opposed perpendicular to the direction of the feed of the liquid crystal cell W. The first roller 181 presses the first optical film F11 toward the liquid crystal cell W, and the second roller 182 presses the liquid crystal cell W toward the first optical film F11. As long as the first roller 181 is configured to press the first optical film F11 toward the liquid crystal cell W, the first roller 181 may have any configuration, and for example, any other component may be interposed between the first roller 181 and the first optical film F11. As long as the second roller 182 is configured to press the liquid crystal cell W toward the first optical film F11, the second roller 182 may also have any configuration, and for example, any other component may also be interposed between the second roller 182 and liquid crystal cell W. For example, when the configuration shown in FIG. 4 is used in the bonding of the second optical film F21, the first optical film F11 may be interposed between the second roller 182 and the liquid crystal cell W in the process of pressing the liquid crystal cell W toward the first optical film F11 by the second roller 182 after the bonding of the first optical film F11.

The first and second rollers 181 and 182 each have a circumference surface made of an elastically deformable material. Specifically, the first and second rollers 181 and 182 each preferably comprise a rubber roller made of silicone rubber. The first and second rollers 181 and 182 may each be entirely made of rubber, or only the circumference surface of each of the first and second rollers 181 and 182 may be made of rubber. Alternatively, the first and second rollers 181 and 182 may each be made of any other elastic material than rubber. It will also be understood that the first and second rollers 181 and 182 may be made of the same material or different materials.

When the first optical film F11 is bonded to the liquid crystal cell W, the first and second rollers 181 and 182 opposed to each other are spaced at a distance shorter than the total thickness of the liquid crystal cell W and the first optical film F11. Therefore, when the first optical film F11 is bonded to the liquid crystal cell W, the first and second rollers 181 and 182 are elastically deformed, respectively, by the reaction forces of the first optical film F11 and the liquid crystal cell W passing between the first and second rollers 181 and 182.

In an embodiment of the invention, the contact length Cb along the feed direction between the second roller 182 and the liquid crystal cell W is longer than the contact length Ca along the feed direction between the first roller 181 and the first optical film F11. The contact lengths Ca and Cb can each be determined by photographing the contact parts of the rollers 181 and 182 with a camera or the like and measuring the actual contact lengths of the parts. In addition, when the widthwise direction is defined as a direction perpendicular to the feed direction (a direction parallel to the first and second rollers 181 and 182), the width of the contact between the first optical film F11 and the first roller 181 is equal to the width of the contact between the liquid crystal cell W and the second roller 182. Therefore, the contact area between the second roller 182 and the liquid crystal cell W is larger than the contact area between the first roller 181 and the first optical film F11.

The pressing force Fa per unit area applied when the first optical film F11 is pressed by the first roller 181 is the value obtained by dividing, by the contact area, the force acting on the first optical film F11 from the contact surface between the first roller 181 and the first optical film F11. The pressing force Fa is preferably 0.08 MPa or more, and more preferably 0.35 MPa or more. The pressing force Fb per unit area applied when the liquid crystal cell W is pressed by the second roller 182 is the value obtained by dividing, by the contact area, the force acting on the liquid crystal cell W from the contact surface between the second roller 182 and the liquid crystal cell W. The pressing force Fb is preferably 0.49 MPa or less, more preferably 0.3 MPa or less, and even more preferably 0.2 MPa or less. When the pressing force Fa per unit area applied when the first optical film F11 is pressed by the first roller 181 is 0.08 MPa or more, stable bonding can be performed while variations in the pressure of the first roller 181 against the first optical film F11 is reduced, so that air bubbles are less likely to occur. When the pressing force Fb per unit area applied when the liquid crystal cell W is pressed by the second roller 182 is 0.49 MPa or less, gap unevenness, abnormal brightness, cracking, or destruction of the liquid crystal cell W can be prevented.

In this embodiment, the pressing force Fb per unit area applied when the liquid crystal cell W is pressed by the second roller 182 is smaller than the pressing force Fa per unit area applied when the first optical film F11 is pressed by the first roller 181.

In the invention, the feature that the pressing force Fb is smaller than the pressing force Fa can be achieved by setting the hardness of the first roller 181 higher than the hardness of the second roller 182 or by setting the diameter of the first roller 181 smaller than the diameter of the second roller 182.

When the pressing force Fb is smaller than the pressing force Fa and when the width of the contact between the first optical film F11 and the first roller 181 is equal to the width of the contact between the liquid crystal cell W and the second roller 182 as mentioned above, the second roller 182, which applies the smaller pressing force per unit area, can have a longer contact length Cb with the liquid crystal cell W along the feed direction. Since the liquid crystal cell W is fed by the frictional forces of the first and second rollers 181 and 182, the second roller 182 with the longer contact length Cb can contribute more to the feed of the liquid crystal cell W than the first roller 181. On the first roller 181 side, the feed may fail to be stabilized due to the influence of tension fluctuations or vibration acting on the first optical film F11, so that air bubbles may occur. When the second roller 182 side, where such an influence does not occur, contributes more to the feed of the liquid crystal cell W, the liquid crystal cell W can be successfully fed in the process of bonding the first optical film F11 thereto. Thus, the first optical film F11 can be more successfully bonded to the liquid crystal cell W. The difference between the pressures Fa and Fb (Fa-Fb) is preferably 0.1 MPa or more, and more preferably 0.15 MPa or more.

The feature that the contact length Cb between the second roller 182 and the liquid crystal cell W is relatively long is also advantageous in that the tolerance to relative torsion between the first and second rollers 181 and 182 is relatively high, so that the required placement accuracy can be low.

The second roller 182 is preferably a driving roller to which the driving force is transmitted from a driving source such as a motor. In this case, the first roller 181 may be a driven roller which rotates as the second roller 182 rotates. When the second roller 182 is a driving roller, the liquid crystal cell W is introduced in a more stable manner by the second roller 182, so that the first optical film F11 can be more successfully bonded to the liquid crystal cell W.

The radius Ra of the first roller 181 and the radius Rb of the second roller 182 preferably satisfy the relation Ra<Rb. In this case, the first roller 181 has a radius smaller than that of the second roller 182, and therefore, the distance D between the position where the first release film F12 is peeled off (the position of the front end of the knife edge part of the peeling mechanism 183) and the position where the first optical film F11 is bonded (the position of the boundary between the first optical film F11 and the liquid crystal cell W on a perpendicular line drawn from the center point of the first roller 181 to the first optical film F11 being bonded) can be made as small as possible. This can prevent the first optical film F11 from being unstable in the bonding position due to tension fluctuations or vibration acting on the first optical film F11 and can make air bubbles less likely to occur, so that the first optical film F11 can be more successfully bonded to the liquid crystal cell W. In view of the stabilization of the first optical film F11 after the peeling-off, the distance D is preferably from 5 to 60 mm. It should be noted that the first roller 181 does not always have a radius smaller than that of the second roller 182 and may have a radius larger than or equal to that of the second roller 182.

The diameter (2Ra) of the first roller 181 is preferably from 15 to 80 mm. If the diameter of the first roller 181 is less than 15 mm, the first roller 181 may have low stiffness, so that it may become unstable during the bonding and may vibrate at a higher rotational speed. If the diameter of the first roller 181 is more than 80 mm, it may become difficult to reduce the distance D between the position where the first release film F12 is peeled off and the position where the first optical film F11 is bonded, so that the first optical film F11 may become less likely to be stable in the bonding position due to tension fluctuations or vibration acting on the first optical film F11. Therefore, when the first roller 181 has a diameter of 15 to 80 mm, the first optical film F11 can be more successfully bonded to the liquid crystal cell W.

The rubber hardness of the second roller 182 is preferably lower than the rubber hardness of the first roller 181. When the rubber hardness of the first and second rollers 181 and 182 is controlled in such a manner, the contact length Ca between the first roller 181 and the first optical film F11 and the contact length Cb between the second roller 182 and the liquid crystal cell W can be set as desired. For example, even when the second roller 182 has a radius equal to or smaller than that of the first roller 181, setting the rubber hardness of the second roller 182 lower than that of the first roller 181 makes it possible to reduce the contact length Ca between the first roller 181 and the first optical film F11 to less than the contact length Cb between the second roller 182 and the liquid crystal cell W.

Specifically, as measured according to the JIS standard (JIS K 6253), the first roller 181 preferably has a rubber hardness of 50 to 100°, and the second roller 182 preferably has a rubber hardness of 30 to 80°. This makes it possible to set the rubber hardness of each of the first and second rollers 181 and 182 at an appropriate value in the range where the rubber hardness of the second roller 182 is lower than that of the first roller 181.

The adjustment of the rubber hardness of the first and second rollers 181 and 182 may be replaced by the adjustment of the hardness of the whole of the roller including the roller core. In this case, the roller hardness can be measured in the following manner. The rubber hardness measurement method according to the JIS standard (JIS K 6253) is used, in which a hardness meter is brought into perpendicular contact with the roller.

In an embodiment of the invention, a backup roller 185 is provided in contact with the opposite side of the first roller 181 from the liquid crystal cell W. The backup roller 185 is so supported that it can rotate about the rotation axis parallel to the first roller 181, and the backup roller 185 is configured to rotate as the first roller 181 rotates. The backup roller 185 preferably has a diameter larger than that of the first roller 181. The backup roller 185 also preferably has a relatively high hardness. Therefore, the backup roller 185 is preferably, but not limited to, a metal roller with a hardness of 90° or more. Even when the first roller 181 has a relatively small diameter, the backup roller 185 can complement the stiffness of the first roller 181 and reduce pressure variations, so that the first optical film F11 can be more successfully bonded to the liquid crystal cell W.

A description is given below of the results of the measurement of the incidence of air bubbles and gap unevenness when the apparatus shown in FIG. 4 was used, in which the diameter (2Ra) and the roller hardness of the first roller 181 and the diameter (2Rb) and the roller hardness of the second roller 182, etc. were each set at different values. In the measurement, the optical film used was a polarizing plate manufactured by NITTO DENKO CORPORATION (VEGQ1724DU), and the liquid crystal cell used was a 40-inch liquid crystal cell taken out of a 40-inch liquid crystal television set manufactured by Sharp Corporation.

The pressing force was measured using PRESCALE for ultra super low pressure manufactured by Fujifilm Corporation, and the pressing force was calculated using a pressure image analysis system manufactured by Fujifilm Corporation, which converted the resulting colored state of PRESCALE into numerical values.

The incidence of air bubbles and the incidence of gap unevenness were each determined by visual evaluation. The incidence of air bubbles and gap unevenness were each calculated based on the results of 1,000 times bonding. The measurement results are shown in Table 1 below.

TABLE 1

| | Pressing force [MPa] | | Roller diameter [mm] | | Roller hardness [°] | | Presence or absence | | |
|---|---|---|---|---|---|---|---|---|---|
| | First roller (Fa) | Second roller (Fb) | First roller (2Ra) | Second roller (2Rb) | First roller | Second roller | of backup roller | Air bubbles | Gap unevenness |
| Example 1 | 0.37 | 0.14 | 60 | 120 | 70 | 60 | Absent | 0.3% | — |
| Example 2 | 0.55 | 0.05 | 60 | 120 | 75 | 50 | Absent | 0.0% | 0.2% |
| Example 3 | 0.37 | 0.14 | 60 | 120 | 70 | 60 | Present | 0.0% | — |
| Example 4 | 0.07 | 0.05 | 60 | 120 | 50 | 50 | Absent | 0.7% | 0.0% |
| Example 5 | 0.55 | 0.5 | 60 | 120 | 75 | 85 | Absent | 0.0% | 0.6% |
| Example 6 | 0.36 | 0.14 | 100 | 120 | 80 | 60 | Absent | 0.7% | — |
| Example 7 | 0.34 | 0.14 | 30 | 120 | 65 | 60 | Absent | 0.0% | — |
| Example 8 | 0.36 | 0.14 | 70 | 120 | 75 | 60 | Absent | 0.3% | — |
| Comparative Example 1 | 0.37 | 0.41 | 60 | 120 | 70 | 75 | Absent | 1.4% | — |

TABLE 1-continued

| | Pressing force [MPa] | | Roller diameter [mm] | | Roller hardness [°] | | Presence or absence of backup roller | Air bubbles | Gap unevenness |
|---|---|---|---|---|---|---|---|---|---|
| | First roller (Fa) | Second roller (Fb) | First roller (2Ra) | Second roller (2Rb) | First roller | Second roller | | | |
| Comparative Example 2 | 0.1 | 0.14 | 60 | 120 | 55 | 60 | Absent | 1.6% | — |
| Comparative Example 3 | 0.37 | 0.37 | 60 | 60 | 70 | 70 | Absent | 1.2% | — |

EXAMPLES

Example 1

In Example 1, the pressing force Fa per unit area applied when the first optical film F11 is pressed by the first roller 181 is 0.37 MPa, the pressing force Fb per unit area applied when the liquid crystal cell W is pressed by the second roller 182 is 0.14 MPa, and the relation Fa>Fb is satisfied. The diameter (2Ra) of the first roller 181 is 60 mm, and the diameter (2Rb) of the second roller 182 is 120 mm. The hardness of the first roller 181 is 70°, and the hardness of the second roller 182 is 60°. The backup roller 185 is not provided. It is apparent that in Example 1, the first optical film F11 is bonded to the liquid crystal cell W in a relatively good manner, although air bubbles slightly appear (0.3%).

Example 2

In Example 2, the pressing force Fa per unit area applied when the first optical film F11 is pressed by the first roller 181 is 0.55 MPa, the pressing force Fb per unit area applied when the liquid crystal cell W is pressed by the second roller 182 is 0.05 MPa, and the relation Fa>Fb is satisfied. The diameter (2Ra) of the first roller 181 is 60 mm, and the diameter (2Rb) of the second roller 182 is 120 mm. The hardness of the first roller 181 is 75°, and the hardness of the second roller 182 is 50°. The backup roller 185 is not provided. In Example 2, not only gap unevenness hardly occurs (0.2%), but also no air bubbles appear (0.0%), so that the first optical film F11 is successfully bonded to the liquid crystal cell W.

Example 3

In Example 3 where the backup roller 185 is provided, the pressing force Fa per unit area applied when the first optical film F11 is pressed by the first roller 181 is 0.37 MPa, the pressing force Fb per unit area applied when the liquid crystal cell W is pressed by the second roller 182 is 0.14 MPa, and the relation Fa>Fb is satisfied. The diameter (2Ra) of the first roller 181 is 60 mm, and the diameter (2Rb) of the second roller 182 is 120 mm. The hardness of the first roller 181 is 70°, and the hardness of the second roller 182 is 60°. In Example 3, no air bubbles appear (0.0%), and it is apparent that the first optical film F11 is successfully bonded to the liquid crystal cell W.

Example 4

In Example 4 where the pressing force Fa is set lower than that in Example 2, the pressing force Fa per unit area applied when the first optical film F11 is pressed by the first roller 181 is 0.07 MPa, the pressing force Fb per unit area applied when the liquid crystal cell W is pressed by the second roller 182 is 0.05 MPa, and the relation Fa>Fb is satisfied. The diameter (2Ra) of the first roller 181 is 60 mm, and the diameter (2Rb) of the second roller 182 is 120 mm. The hardness of the first roller 181 is 50°, and the hardness of the second roller 182 is 50°. The backup roller 185 is not provided. In Example 4, no gap unevenness occurs (0.0%). Although air bubbles slightly appear (0.7%), it is apparent that the first optical film F11 is bonded to the liquid crystal cell W in a relatively good manner.

Example 5

In Example 5 where the pressing force Fb is set higher than that in Example 2, the pressing force Fa per unit area applied when the first optical film F11 is pressed by the first roller 181 is 0.55 MPa, the pressing force Fb per unit area applied when the liquid crystal cell W is pressed by the second roller 182 is 0.5 MPa, and the relation Fa>Fb is satisfied. The diameter (2Ra) of the first roller 181 is 60 mm, and the diameter (2Rb) of the second roller 182 is 120 mm. The hardness of the first roller 181 is 75°, and the hardness of the second roller 182 is 85°. The backup roller 185 is not provided. In Example 5, although gap unevenness slightly occurs (0.6%), no air bubbles appear (0.0%), and it is apparent that the first optical film F11 is bonded to the liquid crystal cell W in a relatively good manner.

Example 6

In Example 6, the pressing force Fa per unit area applied when the first optical film F11 is pressed by the first roller 181 is 0.36 MPa, the pressing force Fb per unit area applied when the liquid crystal cell W is pressed by the second roller 182 is 0.14 MPa, and the relation Fa>Fb is satisfied. The diameter (2Ra) of the first roller 181 is 100 mm, and the diameter (2Rb) of the second roller 182 is 120 mm. The hardness of the first roller 181 is 80°, and the hardness of the second roller 182 is 60°. The backup roller 185 is not provided. It is apparent that in Example 6, the first optical film F11 is bonded to the liquid crystal cell W in a relatively good manner, although air bubbles slightly appear (0.7%).

Example 7

In Example 7, the pressing force Fa per unit area applied when the first optical film F11 is pressed by the first roller 181 is 0.34 MPa, the pressing force Fb per unit area applied when the liquid crystal cell W is pressed by the second roller 182 is 0.14 MPa, and the relation Fa>Fb is satisfied. The diameter (2Ra) of the first roller 181 is 30 mm, and the diameter (2Rb)

of the second roller 182 is 120 mm. The hardness of the first roller 181 is 65°, and the hardness of the second roller 182 is 60°. The backup roller 185 is not provided. In Example 7, no air bubbles appear (0.0%), and it is apparent that the first optical film F11 is bonded to the liquid crystal cell W in a relatively good manner.

Example 8

In Example 8, the pressing force Fa per unit area applied when the first optical film F11 is pressed by the first roller 181 is 0.36 MPa, the pressing force Fb per unit area applied when the liquid crystal cell W is pressed by the second roller 182 is 0.14 MPa, and the relation Fa>Fb is satisfied. The diameter (2Ra) of the first roller 181 is 70 mm, and the diameter (2Rb) of the second roller 182 is 120 mm. The hardness of the first roller 181 is 75°, and the hardness of the second roller 182 is 60°. The backup roller 185 is not provided. In Example 8, air bubbles hardly appear (0.3%), and it is apparent that the first optical film F11 is bonded to the liquid crystal cell W in a relatively good manner.

Comparative Example 1

In Comparative Example 1, the pressing force Fa per unit area applied when the first optical film F11 is pressed by the first roller 181 is 0.37 MPa, the pressing force Fb per unit area applied when the liquid crystal cell W is pressed by the second roller 182 is 0.41 MPa, and the relation Fa>Fb is not satisfied. The diameter (2Ra) of the first roller 181 is 60 mm, and the diameter (2Rb) of the second roller 182 is 120 mm. The hardness of the first roller 181 is 70°, and the hardness of the second roller 182 is 75°. The backup roller 185 is not provided. In Comparative Example 1, air bubbles appear (1.4%), and the first optical film F11 is not successfully bonded to the liquid crystal cell W.

Comparative Example 2

In Comparative Example 2, the pressing force Fb per unit area applied when the liquid crystal cell W is pressed by the second roller 182 is 0.14 MPa, the pressing force Fa per unit area applied when the first optical film F11 is pressed by the first roller 181 is 0.1 MPa, and the relation Fa>Fb is not satisfied. The diameter (2Ra) of the first roller 181 is 60 mm, and the diameter (2Rb) of the second roller 182 is 120 mm. The hardness of the first roller 181 is 55°, and the hardness of the second roller 182 is 60°. The backup roller 185 is not provided. In Comparative Example 2, because of a high incidence of air bubbles (1.6%), the first optical film F11 is not successfully bonded to the liquid crystal cell W.

Comparative Example 3

In Comparative Example 3, the pressing force Fa per unit area applied when the first optical film F11 is pressed by the first roller 181 is 0.37 MPa, the pressing force Fb per unit area applied when the liquid crystal cell W is pressed by the second roller 182 is 0.37 MPa, and the relation Fa>Fb is not satisfied. The diameter (2Ra) of the first roller 181 is 60 mm, and the diameter (2Rb) of the second roller 182 is 60 mm. The hardness of the first roller 181 is 70°, and the hardness of the second roller 182 is 70°. The backup roller 185 is not provided. In Comparative Example 3, the incidence of air bubbles is high (1.2%), and the first optical film F11 is not successfully bonded to the liquid crystal cell W.

DESCRIPTION OF REFERENCE SIGNS

12 First feeder,
14 First defect inspection apparatus,
16 First cutting apparatus,
18 First bonding apparatus,
20 Turning mechanism,
22 Second feeder,
24 Second defect inspection apparatus,
26 Second cutting apparatus,
28 Second bonding apparatus,
181 First roller,
182 Second roller,
183 Peeling mechanism,
184 Take-up roller,
185 Backup roller,
F1 First sheet material,
F11 First optical film,
F12 First release film,
F2 Second sheet material,
F21 Second optical film,
F22 Second release film,
R1 First material roll,
R2 Second material roll,
W Liquid crystal cell.

The invention claimed is:

1. A method for manufacturing a liquid crystal panel, comprising:
   feeding a long laminate from a material roll, the long laminate comprising a release film and an optical film placed on the release film;
   cutting the optical film into a predetermined size while leaving the release film uncut;
   catching the optical film and a liquid crystal cell between a first roller and a second roller opposed to each other, while peeling off the release film from the optical film; and
   applying a pressing force from the first roller to the optical film and applying a pressing force from the second roller to the liquid crystal cell, so that the optical film is bonded to the liquid crystal cell, wherein
   a pressing force Fa per unit area applied when the optical film is pressed by the first roller and a pressing force Fb per unit area applied when the liquid crystal cell is pressed by the second roller satisfy the relation Fa>Fb;
   wherein the first roller has a constant diameter and the second roller has a constant diameter;
   wherein the first and second rollers each have a circumference surface made of an elastically deformable material; and
   wherein Fa is 0.08 MPa or more, and Fb is 0.49 MPa or less.

2. The method according to claim 1, wherein the first roller has a diameter of 15 mm to 80 mm.

3. The method according to claim 2, wherein a backup roller is provided in contact with an opposite side of the first roller from the liquid crystal cell.

4. The method according to claim 1, wherein Fa is 0.35 MPa or more.

5. A system for manufacturing a liquid crystal panel, comprising:
   a feeding mechanism for feeding a long laminate from a material roll, the long laminate comprising a release film and an optical film placed on the release film;
   a cutting apparatus for cutting the optical film into a predetermined size while leaving the release film uncut;
   a peeling mechanism for peeling off the release film from the optical film;

a first roller and a second roller opposed to each other for bonding the optical film to a liquid crystal cell by a process comprising catching the optical film and the liquid crystal cell between the first and second rollers, while peeling off the release film from the optical film by using the peeling mechanism, and applying a pressing force from the first roller to the optical film and applying a pressing force from the second roller to the liquid crystal cell, wherein a pressing force Fa per unit area applied when the optical film is pressed by the first roller and a pressing force Fb per unit area applied when the liquid crystal cell is pressed by the second roller satisfy the relation Fa>Fb;

wherein the first roller has a constant diameter and the second roller has a constant diameter;

wherein the first and second rollers each have a circumference surface made of an elastically deformable material; and wherein Fa is 0.08 MPa or more, and Fb is 0.49 MPa or less.

6. The system according to claim 5, wherein the first roller has a diameter of 15 mm to 80 mm.

7. The system according to claim 6, further comprising a backup roller provided in contact with an opposite side of the first roller from the liquid crystal cell.

8. The system according to claim 5, wherein Fa is 0.35 MPa or more.

* * * * *